United States Patent [19]
Comfort et al.

[11] Patent Number: 5,257,354
[45] Date of Patent: Oct. 26, 1993

[54] SYSTEM FOR MONITORING AND UNDOING EXECUTION OF INSTRUCTIONS BEYOND A SERIALIZATION POINT UPON OCCURRENCE OF IN-CORRECT RESULTS

[75] Inventors: Steven T. Comfort, Poughkeepsie; John S. Liptay, Rhinebeck; Charles F. Webb, Poughkeepsie, all of N.Y.

[73] Assignee: International Business Machines Corporation, Armonk, N.Y.

[21] Appl. No.: 641,987

[22] Filed: Jan. 16, 1991

[51] Int. Cl.⁵ ............... G06F 11/28; G06F 11/30; G06F 9/30
[52] U.S. Cl. ............... 395/375; 364/DIG. 1; 364/265.6; 364/266.5; 364/263
[58] Field of Search ............... 395/375, 800

[56] References Cited

U.S. PATENT DOCUMENTS

| | | | |
|---|---|---|---|
| 3,736,566 | 5/1973 | Anderson et al. | 395/575 |
| 4,760,520 | 7/1988 | Shintani et al. | 395/375 |
| 4,777,594 | 10/1988 | Jones et al. | 395/375 |
| 4,901,233 | 2/1990 | Liptay | 395/375 |
| 5,119,483 | 6/1992 | Madden et al. | 395/375 |
| 5,136,696 | 8/1992 | Beckwitz et al. | 395/375 |
| 5,142,634 | 8/1992 | Fite et al. | 395/375 |

OTHER PUBLICATIONS

IBM Technical Disclosure Bulletin, vol. 25, No. 11B, Apr. 1983, "Shared Cache In A Checkpoint Environment" by J. A. Weiss et al.

*Primary Examiner*—Parshotam S. Lall
*Assistant Examiner*—Richard Lee Ellis
*Attorney, Agent, or Firm*—Lynn L. Augspurger

[57] ABSTRACT

A system whereby a central processor continues operation beyond a serialization point before the architecture defines that it is permissible to do so. According to the system, it is ascertained whether correct results are being achieved after the serializing point. If some doubt develops about the correctness of the results, the processor is returned to its status at the serialization point and the processing is repeated. In one embodiment, correctness of results is determined by way of a monitoring mechanism which depends on the fact that interactions between CPUs are confined to references to storage. The operations which are performed prior to the time that the architecture allows them, are restricted to ones which depend on fetches made from storage. The needed assurance of correct operation is gained by monitoring the storage locations from which fetches are made on behalf of instructions which logically follow the serializing operation, but which are made prior to the time that fetching is allowed to resume. If those storage locations are not changed during the time between when the first such fetch is actually made from one of them, and the time that fetching is allowed to resume, then the results of the processing which was done by the CPU (based on those fetches) must be exactly the same as if all of the fetches and processing was done in a single instant at the moment that the fetches became allowed.

13 Claims, 10 Drawing Sheets

INSTRUCTION DECODING/SIIC MONITORING

I-CACHE MONITORING

SYSTEM FOR MONITORING AND UNDOING EXECUTION OF INSTRUCTIONS BEYOND A SERIALIZATION POINT UPON OCCURRENCE OF IN-CORRECT RESULTS

BACKGROUND OF THE INVENTION

1. Field of the Invention

The present invention relates to the processing of serializing instructions in electronic computer systems.

2. Related Art

When early computers were built in the 1940's and early 1950's, they were simple machines which completed each instruction before fetching the next one. They were built that way because that was the state of the art, and the capability of the technology at the time. This simple operation made it possible for programmers to have a simple understanding of what the computer did without needing to understand the details of its internal operation, and this facilitated the writing of programs.

As more was learned about how to build CPUs (the central processing portion of the computer), it became apparent that there is an advantage in building them with "overlap"; that is, processing begins on one instruction before the CPU is finished processing prior instructions. This can be a simple prefetching of instructions so that the next instruction is ready to be examined as soon as the prior instruction finishes, or it can be a complex preprocessing of multiple instructions, including doing things for them in a sequence different from that which is called for by the program. It also includes caches, which can be viewed as a mechanism for prefetching data from main storage and holding it in the CPU in anticipation that it will be needed. The mechanisms used have been varied and complex.

Even with these changes in CPU design, the conceptual view that the CPU operates by doing each instruction completely before going on to the next has been largely preserved. This view has been preserved for the primary reason that it makes the operation of the CPU simple enough to understand so that it is not intractably difficult to program, and because it facilitates making new generations of computers compatible with previous generations. To maintain this view it is necessary to detect those situations in which a piece of data which is generated by one instruction is used by a subsequent instruction, and make sure that the subsequent instruction is executed using the newly generated value, and not an older value that was in the same register or storage location. The detection is generally done by a (sometimes large) number of compare circuits, and the action to make sure that the correct value is used is carried out by special datapath circuitry, and/or by changes in the control circuitry to delay operation of some (perhaps large) portion of the machine until the needed value is available. The implementation of the detection and correction logic which is needed to maintain this simple sequential view of the CPU's operation is the central problem in designing these overlap mechanisms.

Although this simple view has been largely maintained in modern CPUs, there have been exceptions. In areas where there is no likelihood that a CPU program would be written which would benefit from an interlock, and where it would be costly to implement one, the CPU architecture (the definition of the correct operation) is written to allow unpredictable results. In an architecture which has been in existence for a long time, such as IBM's System/370 (TM) architecture, such definitions are infrequent and largely confined to newer additions to the architecture. In newer and more special purpose architectures, permission to produce unpredictable results may be more prevalent, although the simple sequential view of operation is still generally maintained.

Another complexity which affects the sequential view of CPU operation is multiprocessing. In a multiprocessing system, two or more CPUs are connected to a single main storage, and operate on the contents of that storage simultaneously. This is done in order to allow greater processing power to be brought to bear on a single set of problems than could be otherwise accomplished using a single CPU. Most often multiprocessors are used with multiprogramming systems.

A multiprogramming system is a system of programming in which a number of separate user programs are presented for running, and a program called an operating system controls the running of the separate user programs, making sure that each one gets a fair chance to run on the CPU(s). In such a system, the CPUs are assigned to different user programs at any given moment. Thus, the number of CPUs available increases the aggregate amount of processing power available to work on the total workload, but is not concentrated on a single user program. Since at most moments each CPU is working on a different user program which is in a different portion of storage, in many respects they are operating as completely separate systems most of the time. Nevertheless, this is not true at all times.

There are certain data areas in the operating system which control the allocation of CPUs and other physical resources to the various programs. When the operating system is running on a particular CPU, it will often be making fetches and stores to one or more of these areas. If the operating system is running on two CPUs at the same time, then both of them may be making fetches and stores to the same area. Although this is not the mode of operation most of the time, it can happen hundreds or thousands of times each second, and when it does, it creates special problems.

Programming the operating system in such a way that it can be running on two different CPUs, working on the same data, at the same time, is an interesting programming problem. One must carefully consider the various sequences in which storage locations can be updated by two CPUs operating on the same data. Because the two CPUs operate asynchronously there are a variety of ways in which they can interact even if each CPU operates according to the simple sequential model. To the extent that the CPUs are allowed to deviate from the simple sequential model, the possible interactions become more complex and nonintuitive, and if no restrictions are placed on the degree of sequentially that the CPUs must maintain the programming problem is intractable.

These considerations make it necessary to find some middle ground between the conflicting needs for sequential operation for programmability, and the practical considerations of implementing the hardware. It turns out that a middle ground is possible because of the fact that the need for sequentially is limited both in time and in the amount of program code affected. The problem is restricted in the amount of code affected because it is limited to special portions of code in the operating system which operate on data which is referenced by all of the CPUs. The problem is limited in time, because the only time special things need to be done in the hardware is when the special portions of code are running. This means that the problem can be dealt with by requirements on how programs are written. These requirements will only affect a limited amount of code, and can use mechanisms built in the CPUs which do not need to have the same level of performance that is necessary in more general situations.

Several things have been done in the System/370 architecture to deal with these problems. First of all, some requirements for sequential operation have been imposed, although they still leave considerable room for non-sequential operation to be apparent in the interaction of two CPUs. Further, the architecture defines something called a serialization point.

At a serialization point, the CPU must complete all storage references which are conceptually prior to that point before doing any storage operations which conceptually follow that point. That is, at these points the CPU reverts to the simple sequential mode of operation. The architecture defines that serialization points occur for all interruptions and for a certain (limited) subset of the instructions which are called serializing instructions. For most of the serializing instructions there are two serialization points, one before it begins execution, and another after it completes execution. An example of such a serializing instruction in System/370 architecture is "COMPARE AND SWAP".

Prior to this invention, IBM CPUs implemented serialization in the simple straightforward way; that is, they actually stopped operation and waited for all prior stores to finish, before resuming operation by initiating a fetch of the next instruction. This is clearly the simplest and most straightforward way to implement this architecture, but it is also the implementation with the lowest performance. The frequency of occurrence of these events is such that this implementation was tolerable, although not entirely acceptable.

Documents Incorporated by Reference

U.S. Pat. No. 4,901,233, entitled "Computer System With Logic For Writing Instruction Identifying Data Into Array Control Lists For Precise Post-Branch Recoveries", Issued: Feb. 13, 1990, To: John S. Liptay, Assignee: IBM Corporation, is incorporated by reference, in its entirety, as if printed in full below.

SUMMARY OF THE INVENTION

The architecture of a system does not define how a CPU is implemented; it only defines the results that need to be achieved. In particular, even though the architecture defines that the CPU must stop at a serialization point, and wait for stores to complete before proceeding, this is only a definition of what the correct results are. Any implementation which achieves the same results is correct.

This invention provides a system and method whereby the CPU can continue operation beyond a serialization point before the architecture defines that it is permissible to do so. According to the present invention, it is ascertained whether correct results are being achieved after the serializing point. If some doubt develops about the correctness of the results, the processor is returned to its pre-serialization point status and the processing is repeated.

In the preferred embodiment, correctness of results is determined by way of a monitoring mechanism. This mechanism depends on the fact that the interactions between CPUs are confined to references to storage. In the disclosed mechanism the operations which are performed prior to the time that the architecture allows them, are restricted to ones do not change storage locations; that is, the CPU is not permitted to change any storage locations during this processing.

The needed assurance of correct operation is gained by monitoring the storage locations from which fetches are made on behalf of instructions which logically follow the serializing operation, but which are made prior to the time that fetching is allowed to resume. If those storage locations are not changed during the time between when the first such fetch is actually made from one of them, and the time that fetching is allowed to resume, then the results of the processing which was done by the CPU (based on those fetches) must be exactly the same as if all of the fetches and all of the processing was done in a single instant at the moment that the fetches became allowed. Since the latter would meet the architectural requirements, the former must also.

This monitoring mechanism, when it finds that the storage locations were not modified, provides the needed assurance that the architectural requirements were met. When the monitoring mechanism finds that the storage locations may have been modified, then it causes a mechanism to be invoked which restores the CPU to an internal operating point directly following the serialization point, and causes it to resume operation from that point.

DESCRIPTION OF DRAWINGS

Like numbered elements appearing in more than one FIGURE are designated by like reference numerals.

DETAILED DESCRIPTION OF THE PREFERRED EMBODIMENT

Figure 1:
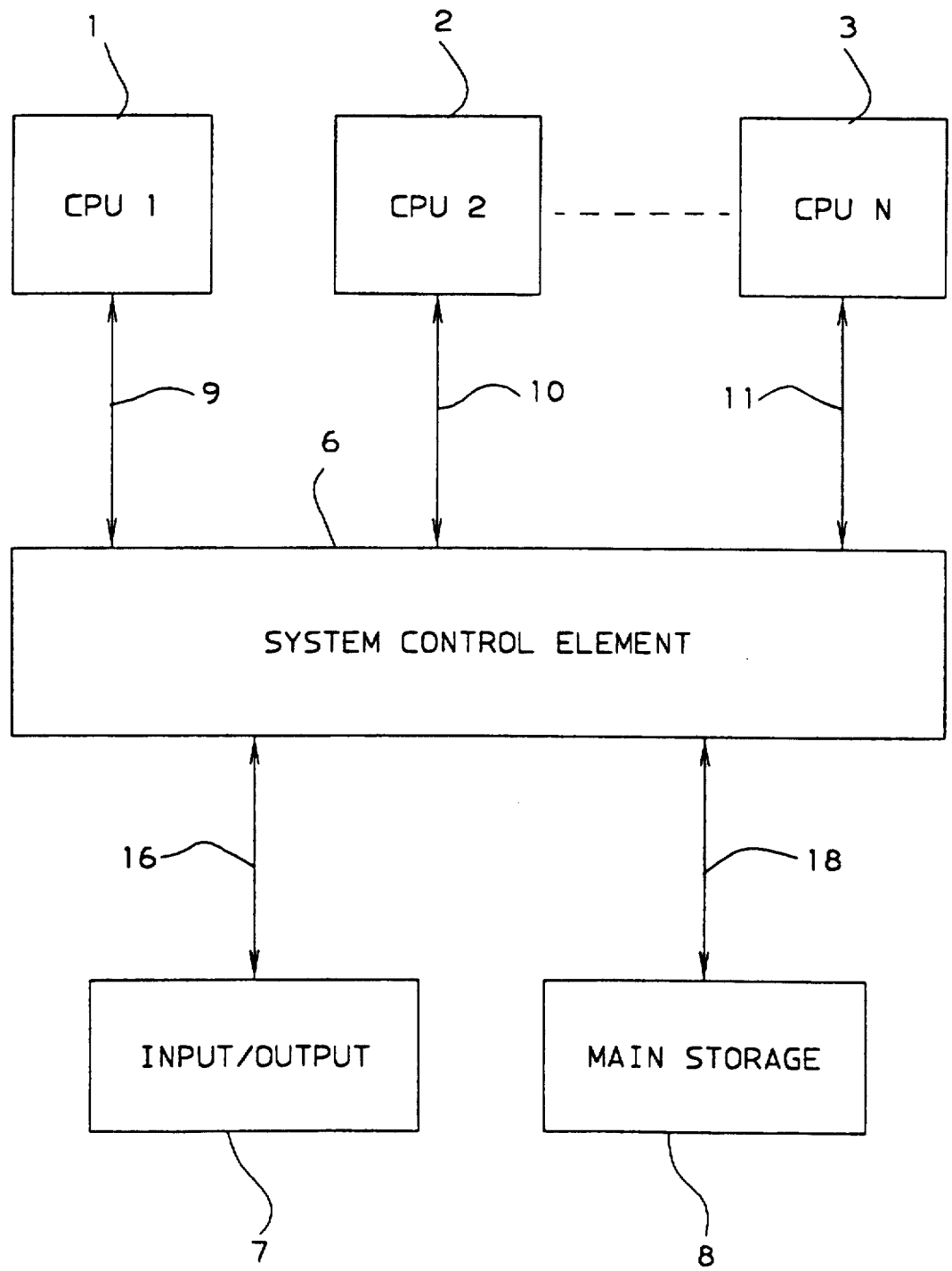
FIG. 1 illustrates a multiprocessor system.

The present invention provides a system and method whereby the CPU can continue operation beyond a serialization point before the architecture defines that it is permissible to do so. According to the present invention, it is ascertained whether correct results are being achieved after the serializing point. If some doubt develops about the correctness of the results, the processor is returned to its pre-serialization point status and the processing is repeated. In the preferred embodiment, correctness of results is determined by way of a monitoring mechanism.

First we will consider how the monitoring mechanism works, by reference to FIGS. 6 through 9. In the preferred embodiment, the operation of the monitoring mechanism depends on the presence of a cache in the system and the manner in which it operates, and it is therefore necessary to begin the discussion of the monitoring mechanism by describing the cache structure and operation. In the preferred embodiment, the cache is a split cache, which is in essence two separate caches, one an instruction cache (I-Cache), and one a data cache (D-Cache). All fetches for instructions are directed to the instruction cache, and all fetches and stores for operands are directed to the data cache. During the course of operation, those storage locations which are the object of instruction fetching are loaded in the instruction cache, and those to which operand references are made are loaded in the data cache. Since these references are usually to different locations, there will be largely different data in each cache, although it is certainly possible for the same cache line to be present in both caches.

A further consideration in the operation of the monitoring mechanism is the way in which stores are handled in the caches. The data cache is one which requires exclusive control of a line when it stores into it; that is, at the time a store takes place, the line does not exist in any other cache in the system. When the CPU discovers that it needs to store into a storage location, the first thing it does is to examine the data cache to see if it has the line loaded, WITH exclusive control of the line. If it does not, then the address of the line is sent to all other CPUs in the system requesting that any of them which have a copy of the line invalidate it in their caches. Also, when a line is loaded from storage (just for fetching) its address is broadcast in order to ensure that no other CPUs have it in their cache with exclusive control. This process of broadcasting addresses is known as cross invalidation, and only after it is complete can the CPU proceed to use a line that it has obtained.

A logical conclusion that can be drawn about this process is that if a cache contains a line, either with exclusive control or without it, then we are certain that no other CPU in the system is changing it. If a line leaves the cache for any reason, either as a result of being invalidated because of another CPU's request, or because of normal aging, then we are no longer certain that no other CPU is changing it.

The instruction cache is never stored into by the CPU, and never holds lines with exclusive control. When the CPU is gaining exclusive control of a line by broadcasting its address to all other CPUs in the system, its own instruction cache does not participate in the process; rather, it is allowed to retain a copy of the line. At a later time when the CPU actually stores into the line in the data cache, the address of the line is sent to the instruction cache, and at that time the line is invalidated in the instruction cache. If that line is still needed for instruction fetching, then when the next instruction fetch is made from that line it will be reloaded from main storage, and if the CPU stores into it again, it will again be invalidated in the instruction cache.

The basic concept underlying the monitoring mechanism can now be understood easily. First of all, when a fetch is made, the data which was fetched is known to be in the cache because all data is fetched through the cache and is present in the cache immediately after the fetch. If no lines are removed from the cache during the interval between the time of the first fetch for information which logically follows the serialization point and the time when such fetches are permitted, then the locations from which those fetches were made cannot have been changed by any other CPU; that is, we have the assurance which is required that we have produced correct results. To state that redundantly, in order to obtain the required assurance, we just need to monitor the cache, and if no lines are removed from the cache during the interval we are monitoring, we have the required assurance.

Although the underlying concept is now clear, there is still a problem to be dealt with, and a design choice to be explained. The design choice is whether to permit the fetches which are made before they are architecturally permitted to consist of both instruction fetches and operand fetches, or to restrict it to instruction fetches. The advantage of permitting both types of fetches to be made is that it increases the amount of processing that can be done prior to the point where fetching is permitted. The disadvantage is that it is then necessary to monitor both caches, and that increases the probability that a line will be found to be removed making it necessary to go back to the instruction following the serialization point and start processing over again.

Two observations were made which resolved this design choice. The first observation was that if only instruction fetches are permitted, then it is still possible to process the instructions fetched up to the point of calculating their addresses and sending the fetch requests to the fetch request queue (which is physically built near the data cache). Then when fetching becomes permitted a list of fetch requests is waiting to be processed and can be dealt with promptly. It seemed that this would allow the majority of the processing that we would hope to do during this period to take place. The second observation was that the likelihood of having cross interrogate hits in the data cache was greater than that of having them in the instruction cache, and therefore monitoring the data cache as well as the instruction cache would increase the likelihood of having a line removed from the cache by more than (the intuitive) 2 to 1. It was therefore decided that in the preferred embodiment we would only permit instruction fetching and only monitor the instruction cache.

The problem which still needs to be dealt with is the problem of determining when monitoring of the instruction cache should start. Before explaining the problem, it should be noted that the desired implementation is one in which the processing of instructions normally continues smoothly past the serialization point. That is, we want an implementation in which the instructions up to and including the serialization instruction are processed with full normal overlap, and subsequent instructions are processed without any break in that overlap except that their operand fetches are held up in the fetch queue until the point at which they are architecturally allowed has been reached.

With this understanding of what is wanted, it can now be defined when monitoring should begin; that is, monitoring should start as soon as the fetch for the first instruction following the serialization point is made. Unfortunately, with the kind of overlap that we want, this instruction fetch occurs (most likely) before the serializing instruction reaches the instruction register; that is, before we know that the serializing instruction exists. Let us consider how can we begin monitoring before we know that we need to be monitoring.

The answer is to monitor all the time, and tag the doublewords of instructions with the needed information so that when we get to the point of knowing that we are dealing with a serializing instruction we have the needed information. This information consists of a single bit for each doubleword which indicates whether the doubleword is still in the I-cache. It is called the SIIC bit, which stands for "still in I-cache".

Figure 6:
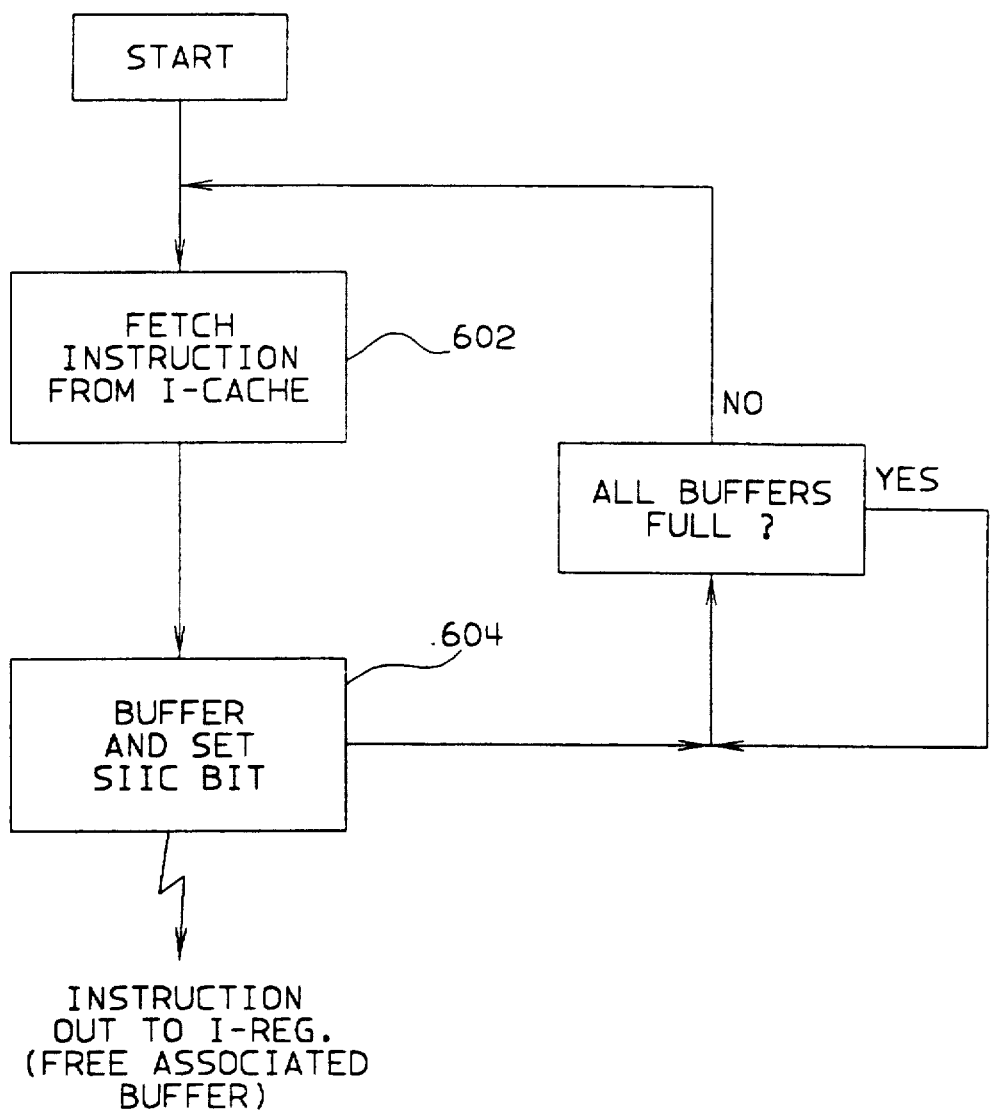
FIG. 6 is a flow chart of instruction fetching and setting of the SIIC bit according to a preferred embodiment of present invention.

The SIIC bit is set (turned ON) during the instruction prefetching process (illustrated in FIG. 6). Whenever a doubleword of instructions is fetched from the I-cache (at 602), it is stored in the instruction buffers (I-Buffers) and its corresponding SIIC tag bit is turned ON (at 604). The SIIC bit is carried with the doubleword and is reset (turned OFF) whenever a line is removed from the instruction cache. As is conventional, the central processor will move instructions from the instructions buffers to the instruction registers (I-REGS) as I-REGS become available. As each instruction is sent from the I-BUFFERS to the I-REGS its associated buffer is made available to hold another instruction from the I-cache.

Figure 8:
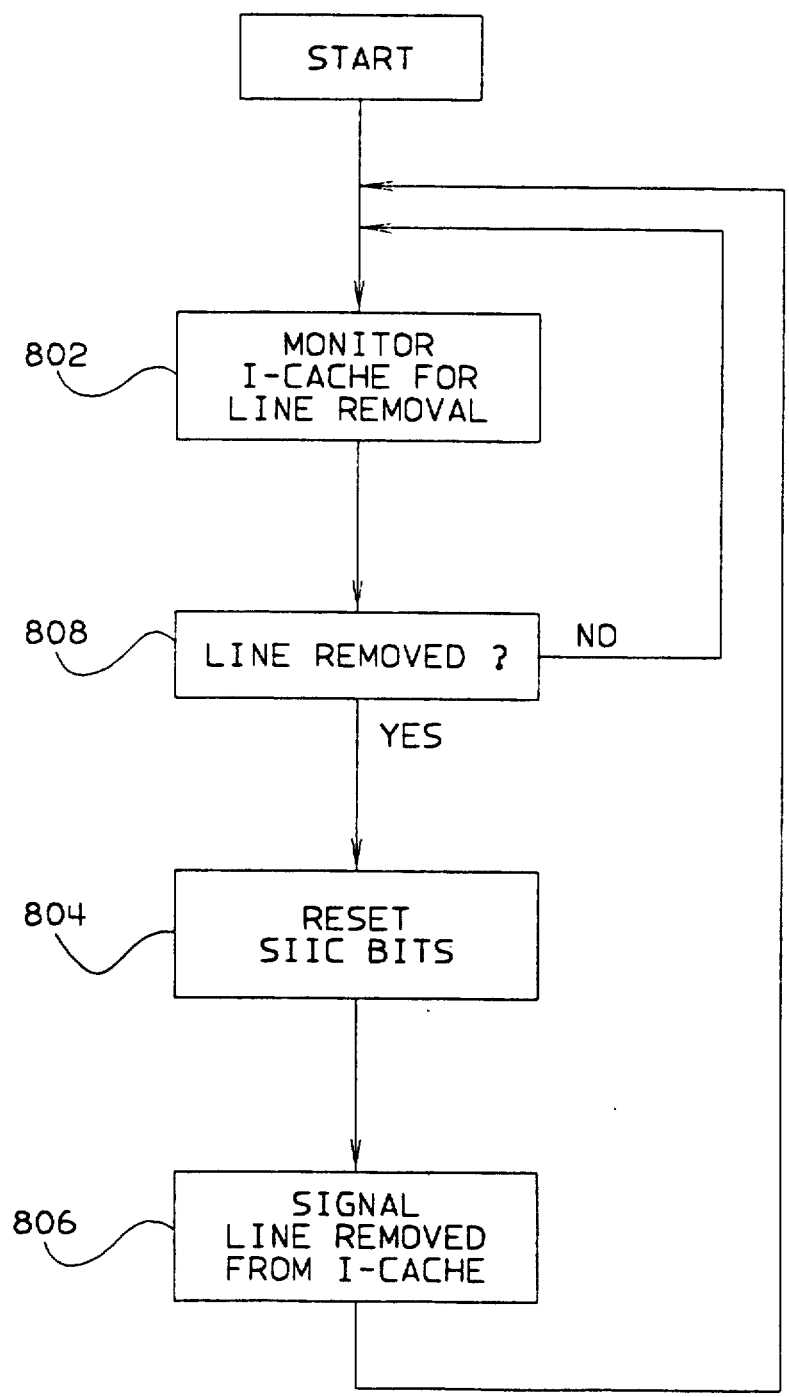
FIG. 8 is a flow chart of instruction cache monitoring according to a preferred embodiment of the present invention.

Resetting of the SIIC bit is controlled by the I-cache monitoring process (illustrated in FIG. 8). Whenever a line is removed from the I-cache (at 802) all of the SIIC bits in the CPU are turned OFF (at 804). Thus when an instruction reaches the decoding logic, if its SIIC bit is ON that means that during the time since it was fetched no lines have been removed from the I-cache.

Figure 7:
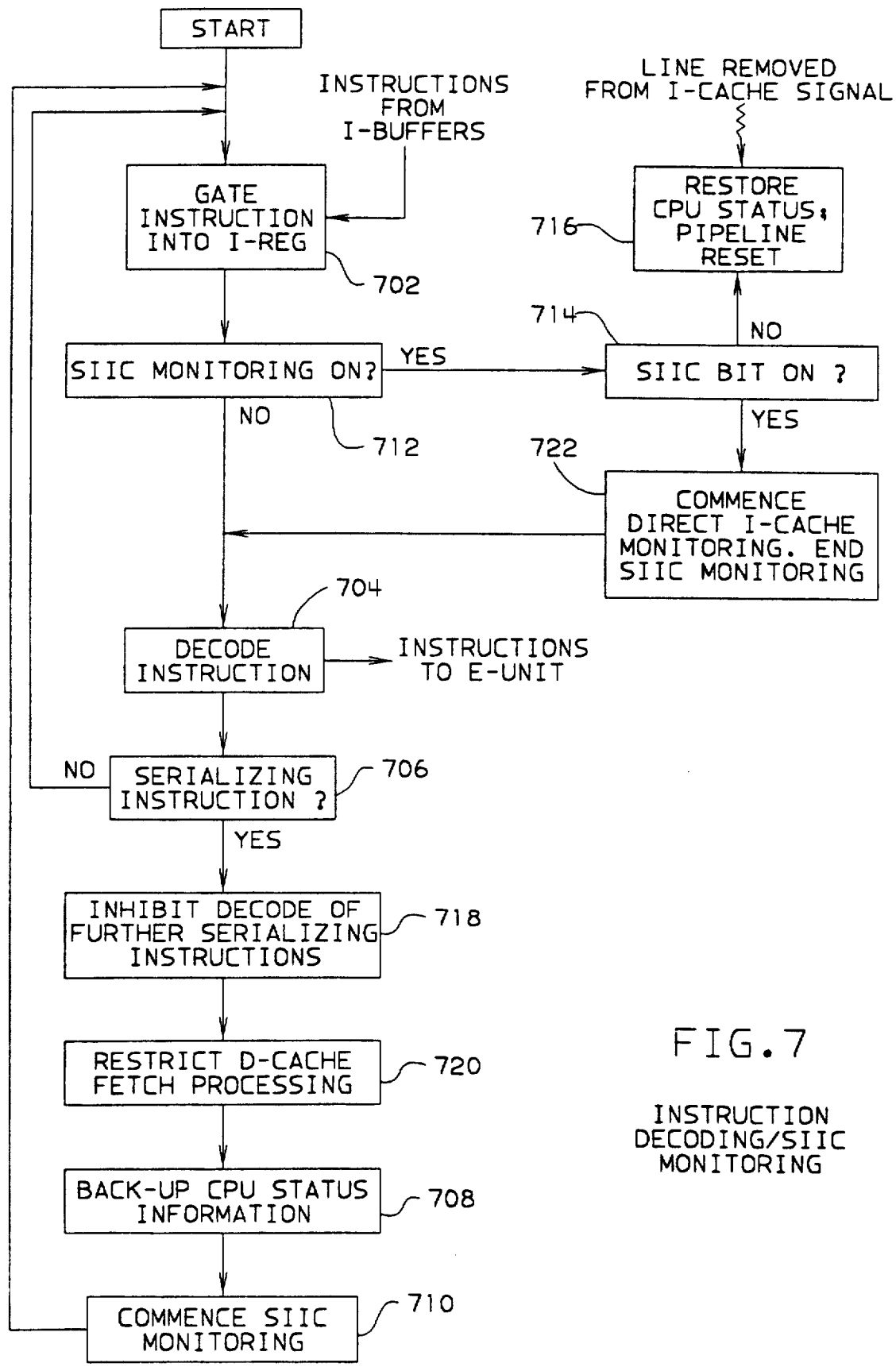
FIG. 7 is a flow chart of instruction decoding and SIIC monitoring according to a preferred embodiment of the present invention.

The instruction decoding/SIIC monitoring process is illustrated in FIG. 7. After prefetching, instructions from the instruction buffers are gated into the instruction registers (at 702). These instructions are, in turn, decoded (at 704). When it is detected (at 706) that a serializing instruction has been decoded, the decoding of further serializing instructions is inhibited (at 718), data cache fetch processing is restricted (at 720), a back up copy of of the CPU's register contents is made (at 708) and the SIIC monitoring process commenced (at 710). Once the SIIC monitoring process has commenced (as determined at 712), the next instruction is examined (at 714) to see if its SIIC bit is ON. If it is ON, then we continue processing, but if it is OFF, then we stop decoding, discard that and any other prefetched instructions, and refetch the instruction stream (at 716). Instruction decoding continues, either immediately, or as soon as the refetching can occur.

As will be apparent from the foregoing description, during the time that a serializing instruction is being processed, the operation of the CPU is different in several ways. First, the decoding of further serializing instructions is inhibited (at 718). In other words, no further serializing instructions are allowed to decode. Second, the operation of the fetch queue is restricted (at 720). Once the instruction following the serializing instruction has been decoded (assuming the SIIC bit is on) direct monitoring of the I-Cache is commenced (at 722) and monitoring of the SIIC bit is ended. The controls for inhibiting the decoding of further serializing instructions and for restricting the operation of the fetch queue will be described in more detail later.

Once direct I-Cache monitoring has been commenced, any removal of a line of from the I-Cache will cause the CPU to be reset (at 716) to its status just after decoding of the serializing instruction (at 716) and to begin refetching from just after the serializing point. The I-cache monitoring process is illustrated in FIG. 8. The removal of a line from the I-cache is indicated by a signal generated at block 806.

Figure 9:
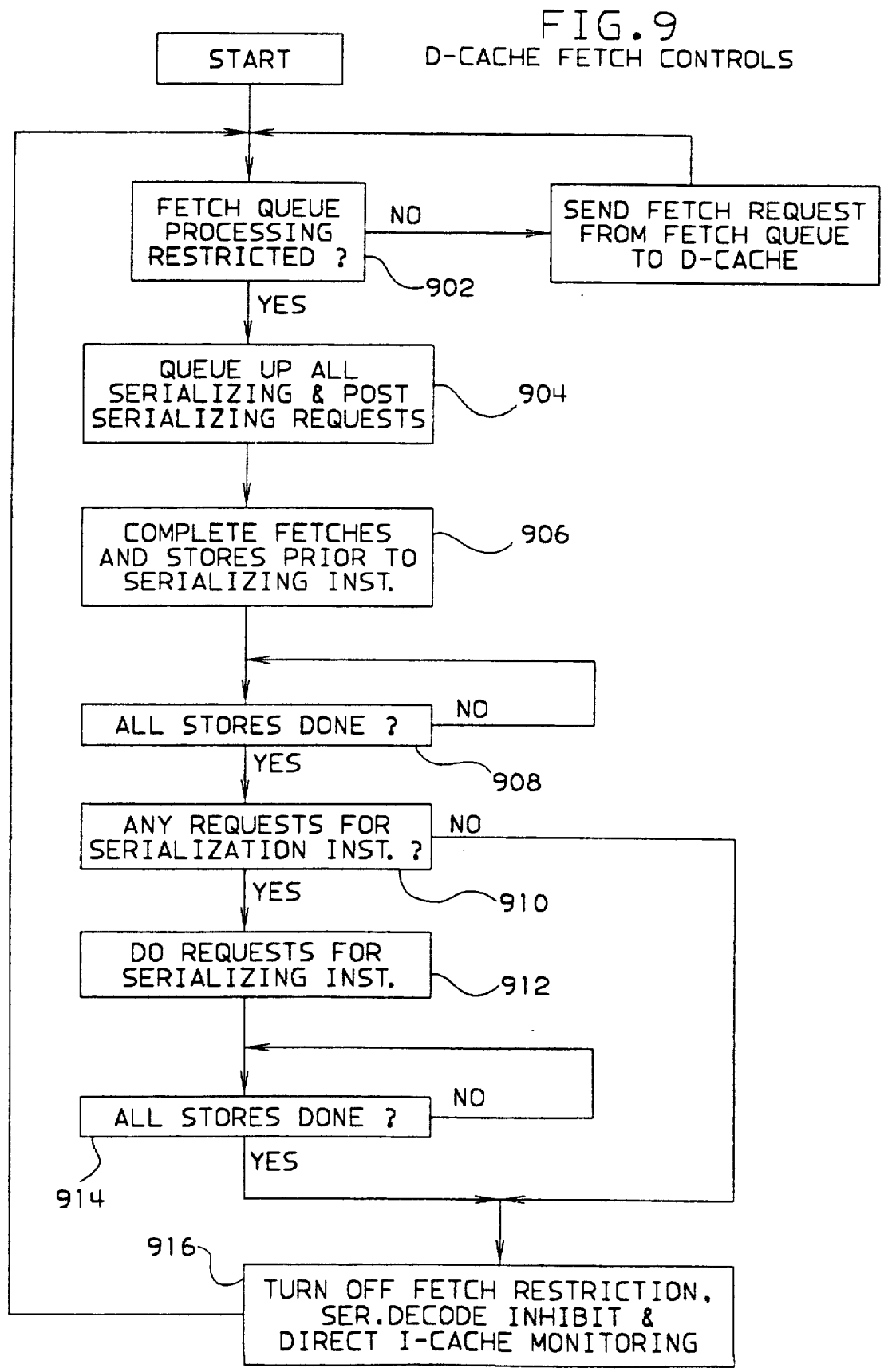
FIG. 9 is a flow chart of the operation of the data cache controls according to a preferred embodiment of the present invention.

As soon as the requests associated with instructions prior to the serializing instruction are sent to the fetch queue, fetch queue processing is restricted as will now be described by reference to FIG. 9. All requests associated with the serializing instruction are sent to the fetch queue and queued up (at 904). The fetch queue is informed that all requests for the serializing instruction have been made. Then, the requests for all the instructions following the serializing instruction are sent to the fetch queue and queued up. As a result of the above-described process, the fetch queue will receive the requests as normal, but will be able to divide the requests into three groups; those requests that preceded the serializing instruction, those for the serializing instruction, and those for instructions that follow the serializing instruction.

At the two points between those three groups of instructions (908,914), the fetch queue will wait for all prior stores to be completed, and only then will it allow subsequent requests to be processed. For some serializing instructions no requests are needed, and for them the two points at which the fetch queue waits for stores to be completed blend into a single point (908). When the second (or only) of these two points is passed, then the processor operation returns to normal (at 916), and another serializing instruction can be decoded.

If during this period, a line is found to be removed from the I-cache (at 802, 808), then all of the instructions beyond the serializing point are discarded, refetched, and reprocessed (at 716). In order to do this, a mechanism is needed which is capable of backing up the internal status of the CPU to the point just past the serializing operation. This is essentially the same capability that is needed to recover from a wrongly guessed branch (when the CPU includes the capability of processing past a branch on a conditional basis), and the design of a mechanism which provides this capability is very much dependent on the way in which the CPU operates.

This invention can make use of whatever branch recovery mechanism is appropriate for the way in which the CPU is implemented. In the preferred embodiment the mechanism is provided is of the back-up register assignment list type, described in detail in U.S. Pat. No. 4,901,233 entitled "Computer System With Logic For Writing Instruction Identifying Data Into Array Control Lists For Precise Post-Branch Recoveries", which is assigned to the same assignee as the present invention.

There are a number of differences between the way branch and serialization operations are processed. In the case of a branch, the new processing after recovery will be at a different address, but in the case of a serializing instruction, processing after recovery will begin at the same address as the instruction stream which was just cancelled. Also, in the case of the branch, conditional processing is over once this recovery is completed, but in the case of the serializing instruction the new instructions processed after recovery are still in conditional mode because the CPU is still operating within the time period before it is architecturally allowed to resume operation. In the case of a serializing operation, if another line is removed from the I-cache, then there will be another recovery action (which is something that could not happen for a branch). When it is found that the point has been reached that processing is architecturally allowed, then conditional processing is terminated, which is the same action that is taken when it is found that a branch was guessed correctly.

An apparatus according to a preferred embodiment of the present invention will now be described by reference to FIGS. 1 through 5.

FIG. 1 illustrates a multiprocessor system. The central piece of this system is the SYSTEM CONTROL ELEMENT 6 which connects together a number of CPUs 1,2,3, the Input/Output 7 portion of the system, and the Main Storage 8. The SYSTEM CONTROL ELEMENT 6 provides all of the communication paths needed between these elements, it buffers data, addresses, and control signals as needed, and it may contain a cache. Each of the CPUs is independently capable of performing all of the operations necessary to execute a program written for this system, and will normally include a cache in order to improve performance. In the case of the preferred embodiment each CPU contains two caches, an I-cache to buffer instruction lines, and a D-Cache to buffer operand lines. There are a series of address and data buses, and control signals 9,10,11 which run between the CPUs and the SYSTEM CONTROL ELEMENT 6, others 16 which run between the Input/Output 7 portion of the system and the SYSTEM CONTROL ELEMENT 6, and still others 18 which run between Main Storage 8 and the System Control Element6. Each of these sets of communication paths contains multiple signals, and is designed to suit the needs of the particular type of element that is connected to the SYSTEM CONTROL ELEMENT 6.

Figure 2:
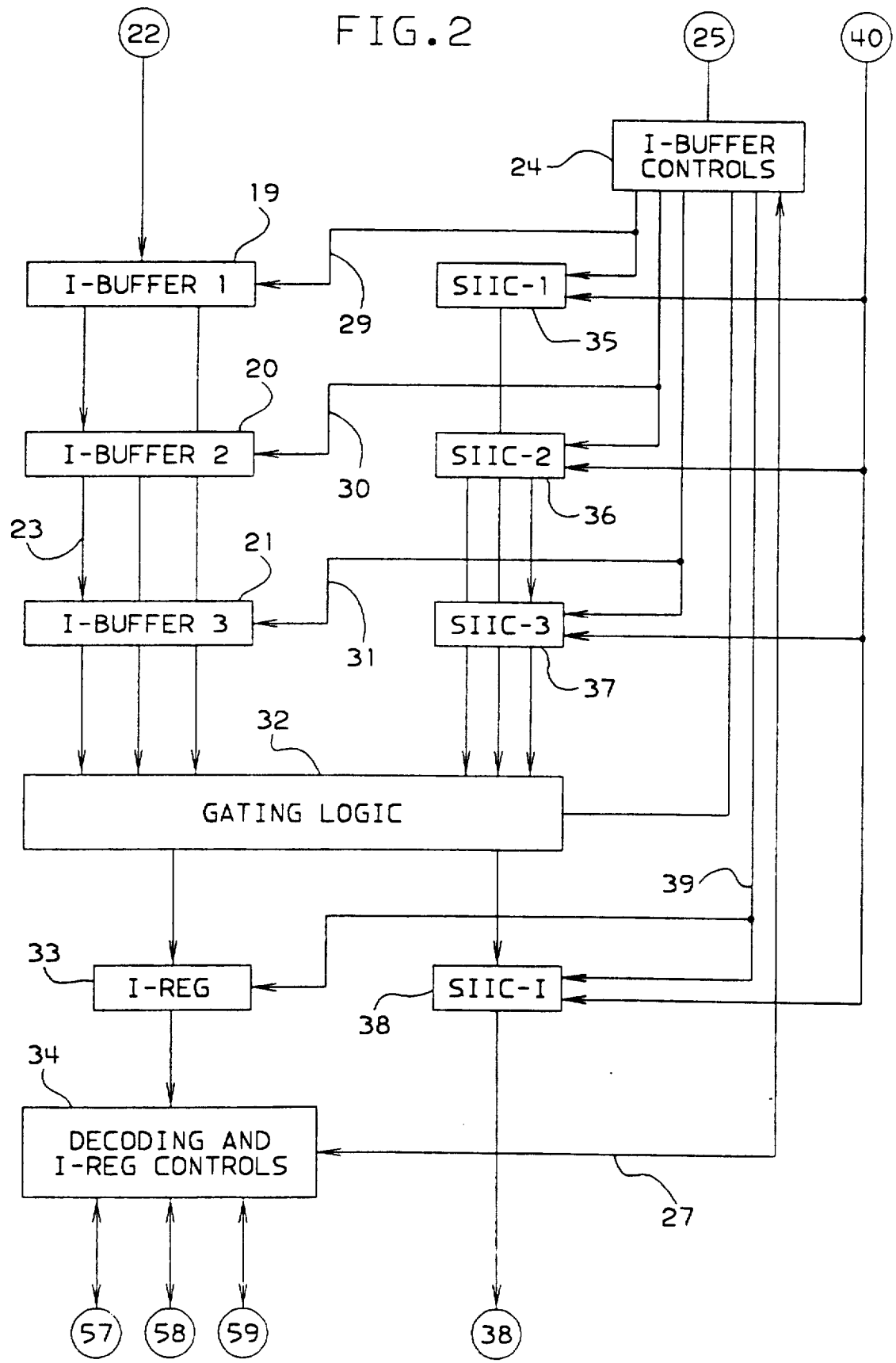
FIG. 2 illustrates the instruction buffering, and instruction decoding portion of the CPU.

FIG. 2 illustrates the instruction buffering, and instruction decoding portion of the CPU. It includes a number of instruction buffers (I-Buffers) which hold instructions that have been fetched and are awaiting decoding. These are represented by I-Buffers 1, 2, and 3 (reference numerals 19, 20 and 21, respectively). The I-Buffers 19–21 can receive their data directly from the I-cache over a bus 22, and/or can receive their data from one another as in the case of I-Buffer 3 (21) which receives its data from I-Buffer 2 (20) over a bus 23. The I-Buffers 19–21 are preferably of a size which is equal to the amount of data which is delivered from the I-cache in a single cycle, which is commonly a doubleword in a CPU that implements the System/370 architecture.

The ingating to the I-Buffers 19–21 is controlled by a set of controls 24 which keep track of what data is in the I-buffers, request additional data from the I-cache as needed, remember what is on the way, and keep track of what instructions are being taken by the I-register for decoding. The controls 24 control ingating to the I-buffers with a set of control signals 29,30,31. The controls 24 communicate with the I-cache over a set of control lines 25 which are used to make requests, send the addresses from which data is wanted, and receive information about the progress of requests. The controls 24 also control a set of gates 32 which select data that is to be sent to the I-REG 33, and they communicate with the DECODING AND I-REG CONTROLS 34 over a set of signals 27. The instruction register (I-REG) 33 which receives instructions from the gating logic may contain one or more instructions which are presented to the DECODING AND I-REG CONTROLS 34 so that they may be examined and passed on to the appropriate portions of the execution logic for execution. All of this logic is structured in the way that is appropriate for the needs of the particular CPU that is being designed.

For each I-buffer, and I-register, there is an accompanying bit 35,36,37,38 called an SIIC bit. This bit is controlled by the same signals 29,30,31,39 which control ingating to the I-buffers and the I-REG. Whenever data from the I-cache is ingated into one of the I-buffers, such as I-BUFFER 1 (19), then the associated SIIC bit 35 is set to ONE. Whenever data is ingated from one I-buffer to another, such as from I-BUFFER 2 (20) to I-BUFFER 3 (21), then the SIIC bit associated with the source I-buffer 36 is gated to the SIIC bit associated with the destination I-buffer 37. Whenever data is gated from one (or more) of the I-buffers to the I-REG, then the SIIC bit associated with the I-buffer from which the first byte of data came is gated to the SIIC bit associated with the I-REG 38.

There is a signal 40 from the I-cache which is active whenever a line is removed from the I-cache for whatever reason. This signal 40 goes to each of the SIIC bits 35,36,37,38 and sets each of them to ZERO. The effect of this is that if, when an instruction reaches the I-REG 33 its SIIC bit 38 is still ONE, then it is known that no lines have been removed from the I-cache since it was fetched; that is, that instruction must still be in the I-cache.

Figure 4:
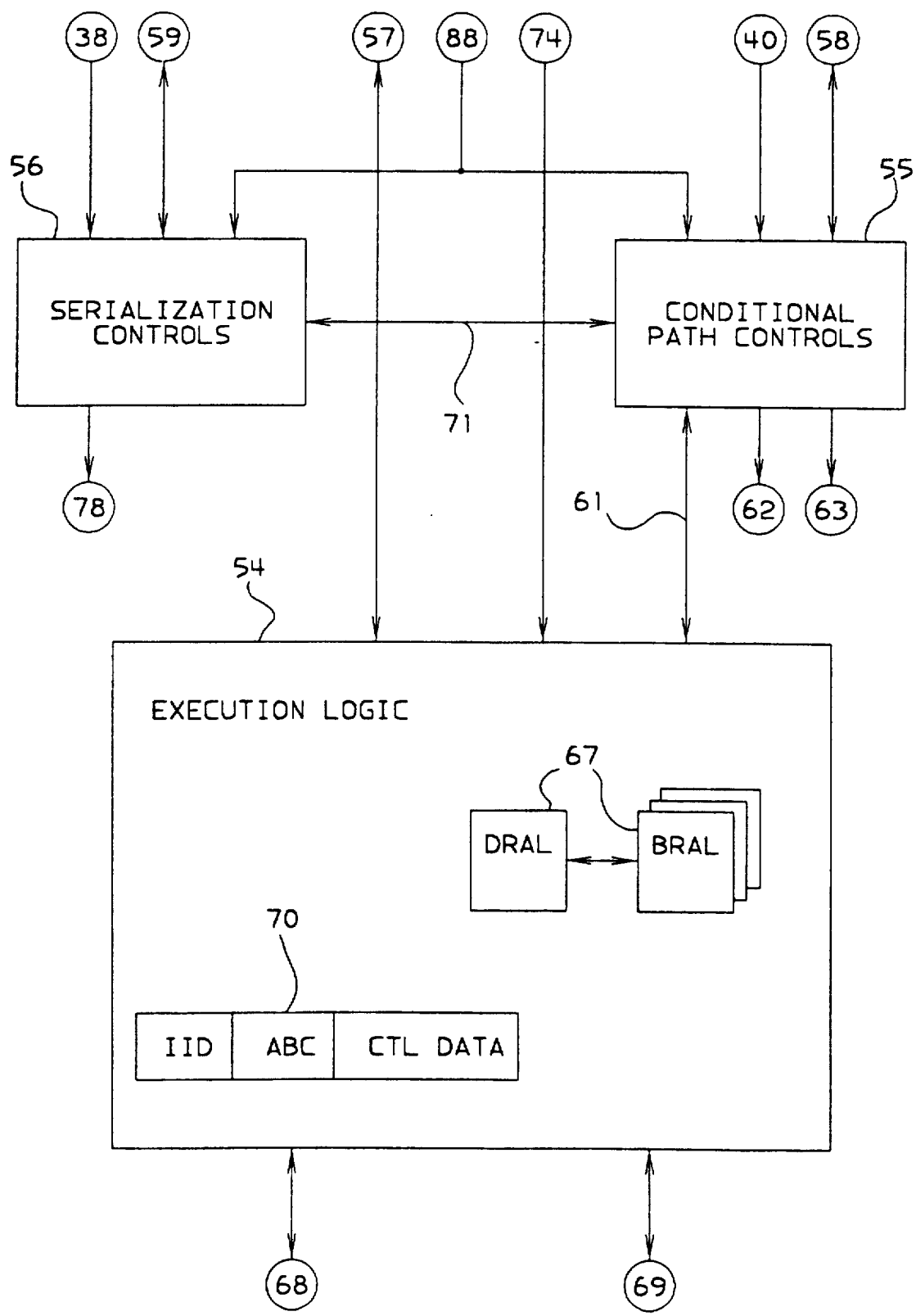
FIG. 4 illustrates the main EXECUTION LOGIC 54 of the CPU, the CONDITIONAL PATH CONTROLS 55, and the SERIALIZATION CONTROLS 56.

The DECODING AND I-REG CONTROLS 34 contains the logic which examines the instruction(s) in the I-REG 33, determines whether the instruction can be passed to the EXECUTION LOGIC [54 in FIG. 4], and decodes a number of signals which are helpful in moving the instruction to the correct portion of the execution logic. There are times when an instruction is decoded, and it is not clear what instruction is correct to decode next. One example of a situation like this is when a branch is encountered. Until the EXECUTION LOGIC 54 determines whether the branch is taken, it is not known for sure whether the next instruction to be executed is the sequentially next one in storage, or the one at the target address.

In order to avoid wasting time, the DECODING AND I-REG CONTROLS 34 makes a guess about which direction the branch will go. The preferred mechanism for making this guess is a conventional branch history table (an apparatus that makes a branch direction guess based on data recorded about prior operation of the CPU) although this is not a requirement of the present invention. Alternative mechanisms, such as an apparatus for making a guess based on simple examination of the instruction, can be substituted for the branch history table. If the decision is to continue with the sequential instructions, then the DECODING AND I-REG CONTROLS 34 continues gating instructions from the GATING logic 32 into the I-REG 33 and processing them.

If the decision is to process the instructions at the target address of the branch, then the DECODING AND I-REG CONTROLS 34 signals the I-BUFFER Controls 24 to clear the I-buffers and start fetching instructions over again, this time from the target address. When this happens, all of those instructions beyond the branch are considered to be conditional; that is, depending on the outcome of the branch they may really end up being executed, or it may be necessary to undo them. In order to control this, there are some CONDITIONAL PATH CONTROLS (55 in FIG. 4) which the DECODING AND I-REG CONTROLS 34 communicates with over signals 58. The CONDITIONAL PATH CONTROLS 55 are described in greater detail below, but at this point, it would be noted that the controls are preferably of a type that allows there to be multiple conditional paths past multiple unresolved branches.

Advantageously, this invention can use a conditional path mechanism designed for branches (of any of a number of types known in the prior art), for a different operation, serializing instructions. What serializing instructions share in common with branches is an uncertainty about what instruction is to be executed next. In the case of branches, this uncertainty derives from not knowing for sure where the next instruction should be fetched from. In the case of serializing instructions, we know for certain where it will be fetched from, but we do not know whether some other processor may change it before we reach the serializing point.

Figure 3:
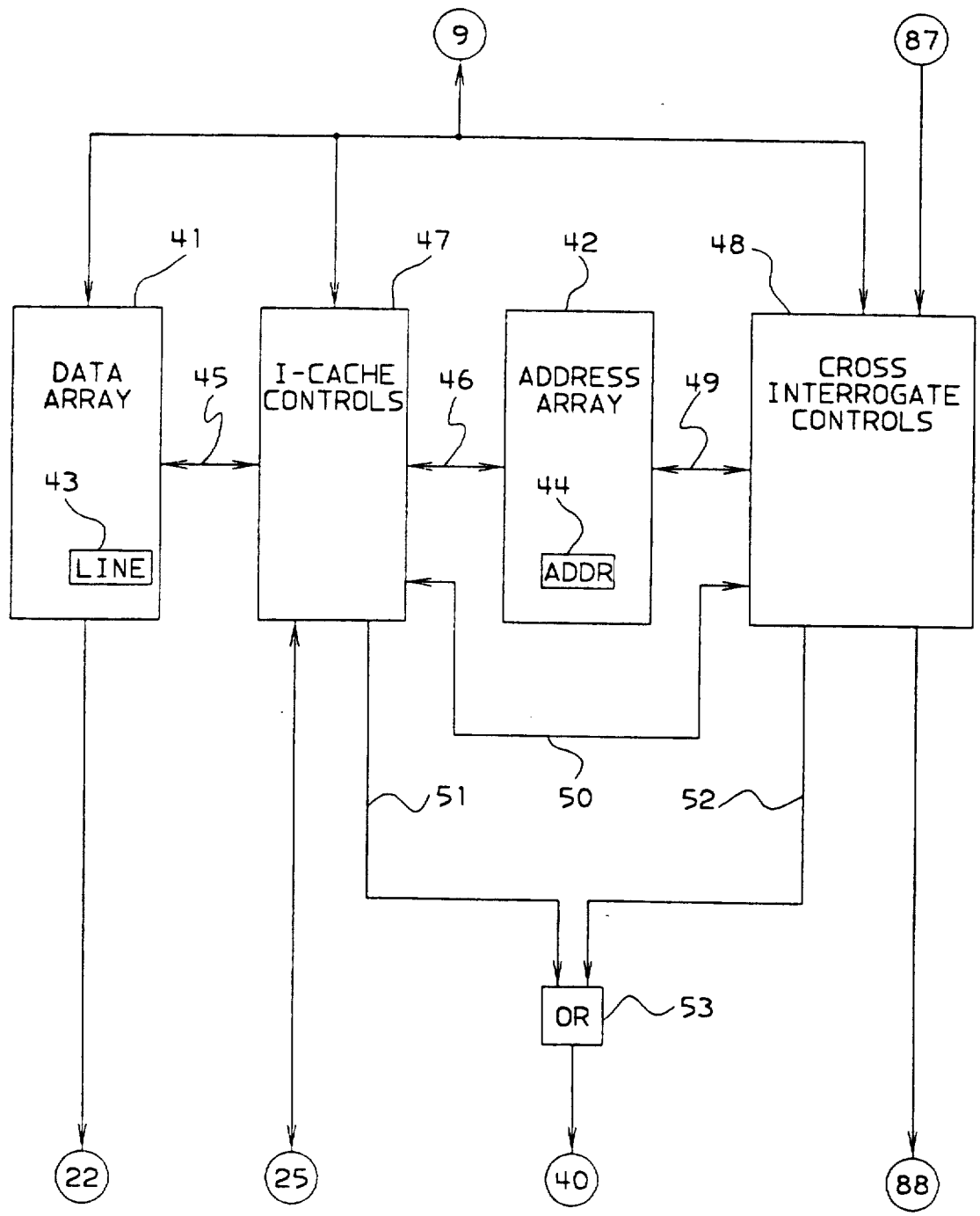
FIG. 3 illustrates the instruction cache.

In order to process instructions past the serializing point, it is necessary to be able to undo those instructions in the event of a possible change to them, just as we must undo instructions when a branch does not go in the direction guessed. When a serializing instruction is decoded, the DECODING AND I-REG CONTROLS 34 communicate with a set of SERIALIZATION CONTROLS (56 in FIG. 4) over a set of signals 59 both as part of process of decoding the instruction, and to initialize those controls for processing the instruction. In the event that a serializing instruction is already being processed (but not not yet completed) when a new serializing instruction is encountered, then a signal from the SERIALIZATION CONTROLS 56 prevents the DECODING AND I-REG CONTROLS 34 from decoding the new serializing instruction. In addition, when a serializing instruction is decoded the DECODING AND I-REG CONTROLS 34 communicate with the CONDITIONAL PATH CONTROLS (55 in FIG. 4) to start a conditional path. FIG. 3 illustrates the instruction cache. This cache contains two arrays, a DATA ARRAY 41 and an ADDRESS ARRAY 42. The DATA ARRAY 41 contains lines of data from main storage, and for each line 43 in the DATA ARRAY, the ADDRESS ARRAY 42 contains an address 44 which identifies where in main storage the line came from, and control bits to record the status of the line. The I-CACHE Controls 47 control the movement of data to and from the arrays 41,42, and the placement of data in those arrays. The I-CACHE Controls 47 use a set of signal lines 25 to communicate with the I-BUFFER Controls (24 in FIG. 2). The signals 25 provide information about the addresses of locations from storage that need to be fetched, about how those fetches are being processed, and when data will be returned. Data is sent f&om the instruction cache over a bus 22 from the DATA ARRAY 41 to the instruction buffers (19,20 in FIG. 2).

When it is necessary to move data from main storage into the instruction cache, the instruction cache communicates with the SYSTEM CONTROL ELEMENT [6 in FIG. 1] using some of the signals 9 between the CPU and the SYSTEM CONTROL ELEMENT 6. These signals 9 include both control signals that go to and from the I-CACHE Controls 47 to coordinate the operation of the two parts of the system, and data signals which go to the DATA ARRAY 41 for the actual return of data. When lines of data are moved into the instruction cache, the I-CACHE Controls 47 also communicate with the ADDRESS ARRAY 42 over signals 46 to determine where in the cache the line should be placed, and to record its presence, and with DATA ARRAY 41 over signals 45 to make sure that the data is placed in the correct place in the DATA ARRAY.

Among the signals 9 from the SYSTEM CONTROL ELEMENT 6 are signals which indicate when some other processor in the system wants exclusive control of a particular line of main storage, or when it wants non-exclusive control and needs to make sure that this CPU does not have exclusive control. Those signals come to the Cross Interrogate Controls 48 which are associated with the instruction cache. When these controls receive such a signal they determine whether that line is in the instruction cache, and whether it is necessary to remove it. To carry this out, they have signals 49 to communicate with the ADDRESS ARRAY 42, and other signals 50 to communicate with the I-CACHE Controls 47.

The foregoing description of the instruction cache is known in the prior art. What is new, and added according to the preferred embodiment of the present invention, is a signal 51 from the I-CACHE Controls 47 which comes on whenever those controls remove a line from the cache as a result of normal cache operations, and a signal 52 from the Cross Interrogate Controls 48 which comes on whenever those controls remove a line from the cache. These two signals 51,52 are ORed together by a logical OR circuit 53 to produce a signal 40 which comes on whenever a line is removed from the instruction cache for any reason.

Another feature provided in the preferred embodiment of the present invention is a signal 87 from the STORE QUEUE (64 in FIG. 5) which comes to the Cross Interrogate Controls 48, and a signal 88 generated by the Cross Interrogate Controls 48. The incoming signal 87 indicates that the FETCH QUEUE 65 has completed all requests prior to and associated with the serializing operation, and that all store operations pending in the STORE QUEUE AND BUFFERS (64 in FIG. 5) have been processed. This means that the CPU has reached the point where the architecture permits subsequent fetching to begin. However, the CPU cannot return to normal operation until any cross interrogate requests which have come in prior to this point have been processed. Therefore, the signal 87 comes to the Cross Interrogate Controls 48, and then when there are no prior cross interrogate operations pending, the Cross Interrogate Controls 48 generate another signal 88 which notifies the rest of the CPU that normal operation may be resumed.

FIG. 4 illustrates the main EXECUTION LOGIC 54 of the CPU, the CONDITIONAL PATH CONTROLS 55, and the SERIALIZATION CONTROLS 56. The EXECUTION LOGIC 54 contains all of the logic needed to produce the results called for by the instructions, and contains most or all of the registers needed to hold the status of the processor, such as the General Registers, the Floating Point Registers, the Control Registers, and the Program Status Word in a processor implementing the System/370 architecture. Its principal interfaces are to receive instructions from the DECODING AND I-REG CONTROLS (34 in FIG. 2) over a set of signals 57, and to make fetch and store requests by communicating with the FETCH QUEUE (65 in FIG. 5) over a set of signals 68, and with the STORE QUEUE AND BUFFERS (64 in FIG. 5) over a set of signals 69.

The manner in which the EXECUTION LOGIC 54 works can take many different forms while still being usable with the present invention. Nevertheless, it needs the ability to deal with conditional instruction paths. In the preferred embodiment the EXECUTION LOGIC is of the type that contains multiple execution elements performing different operations at the same time, and possibly in an order different from the order in which those operations were called for by the program. An example of such a execution logic is described in U.S. Pat. No. 4,901,233.

The CONDITIONAL PATH CONTROLS 55 can also take various different forms, the particular form chosen depending on the structure of the EXECUTION LOGIC 54 and of the rest of the processor. There are several examples in the prior art of structures that can be used. The IBM System/360 Model 91 CPU had multiple execution elements and could execute instructions out of their logical sequence. In that processor, instructions beyond a conditional branch could be decoded and sent to the execution elements before the branch was resolved. All actions related to such instructions carried with them a conditional bit which identified them as conditional. If the branch did not go in the direction guessed, then all operations which are tagged as conditional are discontinued. This CPU only allowed decoding to proceed past a single unresolved branch.

The IBM System/360 Model 85 CPU executed all instructions in their logical sequence, and it allowed instructions beyond only a single conditional branch to be decoded. Because all instructions were executed in sequence, when a branch executed (and its direction was resolved), all of the instructions in the CPU were ones that were beyond the branch, and were therefore conditional. Therefore, in the event that a branch guess was wrong all operations going on in the processor needed to be discarded. That is, unlike the Model 91, there was no need to explicitly tag operations as conditional because the sequential execution of the processor made that implicit.

The IBM 3033 CPU executed all instructions in their logical sequence just as the Model 85 did, but it allowed instructions beyond two conditional branches to be decoded. As with the Model 85, there was no need to explicitly tag instructions as conditional because when a branch was executed (and its direction resolved) all of the operations left in progress were ones which logically followed the branch and were therefore conditional on it.

U.S. Pat. No. 4,901,233 describes a mechanism for effecting precise recoveries after a guessed wrong branch in a CPU which allows instructions to be executed out of sequence, which allows the execution of those instructions to proceed to the point of computing their final results and placing them in their final location in internal registers, and which allows execution to proceed past an arbitrary number of unresolved branches.

Each time that an unresolved branch or a serializing instruction is decoded, the CONDITIONAL PATH CONTROLS 55 are signalled by the DECODING AND I-REG CONTROLS (34 in FIG. 2) and start up a new set of controls, called a conditional path, to control the instructions along that path. The CONDITIONAL PATH CONTROLS 55 provide for one or more conditional paths, and when all of them are in use the CONDITIONAL PATH CONTROLS 55 signal the DECODING AND I-REG CONTROLS (34 in FIG. 2) to not decode any more such instructions.

The controls for each conditional path receive the necessary inputs to determine when the instruction which caused it to be turned on is determined to have been guessed correctly or not. When this determination is made, the conditional path signals all necessary parts of the CPU that the guess was correct or wrong. This signaling is included within the signals 58 to the DECODING AND I-REG CONTROLS 34, the signals 61 to the EXECUTION LOGIC 54, the signals 71 to the SERIALIZATION LOGIC 56, the signals 62 to the STORE QUEUE AND BUFFERS (64 in FIG. 5), and the signals 63 to the FETCH QUEUE (65 in FIG. 5).

Figure 5:
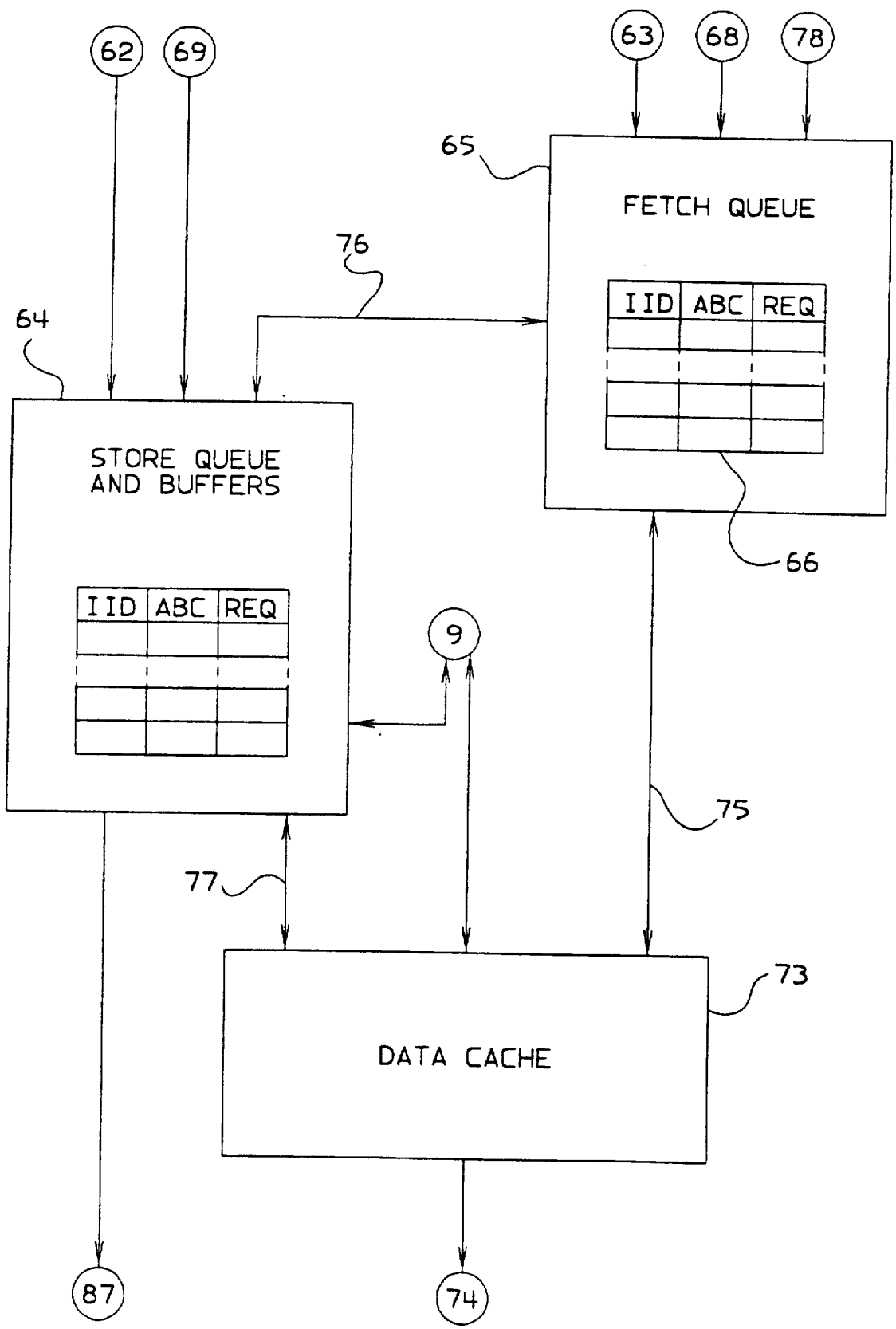
FIG. 5 shows the DATA CACHE 73, and two mechanisms associated with it, the FETCH QUEUE 65 and the STORE QUEUE AND BUFFERS 64.

After receiving these signals, the various parts of the CPU take the necessary steps to adjust their operations; that is, if the guess was correct then the operations which were part of that conditional path are no longer considered conditional (as part of that path, but may still be part of another conditional path), and if the guess was wrong then they are cancelled. Logic in all of the parts of the CPU that carry out actions along conditional paths is designed in such a way as to be able to carry out these operations. This logic is described in greater detail below and in U.S. Pat. No. 4,901,233. Elements from this reference are shown in FIGS. 4 and 5, where an ABC field 66,70 is shown as part of the controls in the EXECUTION LOGIC 54, STORE QUEUE 64 and the FETCH QUEUE 65, and also where a Decode Register Assignment List (DRAL) and Back-up Register Assignment Lists (BRALs) 67 are shown in the EXECUTION LOGIC 54. After a conditional path is resolved, the controls for it in the CONDITIONAL PATH CONTROLS 55 are reset so that it is available for use by another conditional instruction.

Figure 10:
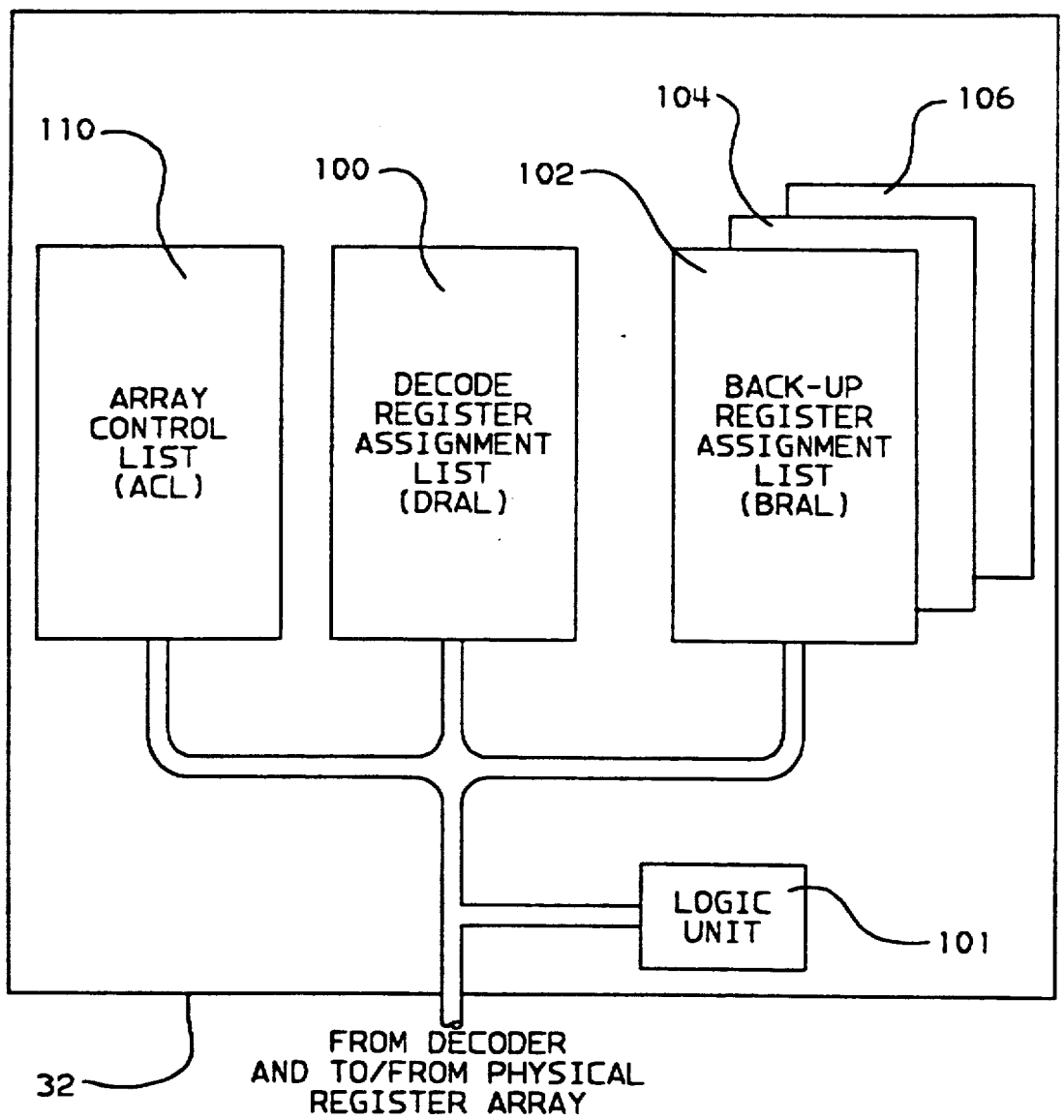
FIG. 10 is a diagram of a conditional path recovery mechanism.

Referring now to FIG. 10, the detailed structure of the recovery mechanism comprising elements 66, 67, and 70 is shown. A Decode Register Assignment List (DRAL) 100 is connected to incoming and outgoing status and control lines. Logic unit 101 is also connected to incoming and outgoing status and control lines for monitoring and controlling the contents of the DRAL. The DRAL is used when instructions are decoded to translate architected logical register assignments (e.g. GPRs named within instructions) into physical register assignments. The DRAL contains one position for each logical register, and that position contains the number of the physical register that has been most recently assigned to receive value for that logical register.

As each instruction is decoded, the logical registers it references are looked up in the DRAL to determine what physical registers are assigned to the logical registers, and as new physical registers are assigned to receive results, the DRAL is updated to reflect these assignments. In this way, each instruction which uses a physical register is directed by the DRAL to find the physical register which is assigned to the most recent instruction to reference that logical register.

Back-up Register Assignment Lists 102, 104 and 106 are connected to receive the entire contents of the DRAL 100 at particular points of operation. There is normally at least one BRAL in the system corresponding to each DRAL. The use of one, two or three BRALs allows the processing of one, two or three conditional paths respectively, without waiting. According to the present invention, a conditional path can be created through the decoding of a conditional branch instruction or a serializing instruction. Each BRAL has the same structure as the DRAL, and is connected to it in such a way that in one cycle the entire contents of the DRAL may be copied into the BRAL, or vice versa. These transfers are controlled by logic unit 101. It is used, for example, when a serializing instruction is encountered by the decoder to save the contents of the DRAL in case the instructions conditionally executed beyond the serializing instructions can not complete due to a line being removed from the I-cache.

The need for creation of a conditional path can be created by decoding of either a serializing instruction or a conditional branch instruction. These two types of instructions will be referred to collectively as "conditional path causing instructions". One difference, however, between serializing instructions and conditional branch instructions is that after a serializing instruction is decoded, the decoding of further serializing instructions is inhibited until after the first decoded serializing instruction has completed execution. Thus, at any given time, only one conditional path can have been activated by the decoding of a serializing instruction. Conditional branches, however, have no such limitation on their decoding. Thus, at any given time, more than one conditional path can be active, having been caused by the decoding of a plurality of conditional branches or by decoding of a serializing instruction combined with one or more conditional branches.

If only one BRAL is provided for each DRAL, it is normally possible to decode past only one conditional path causing instruction. However, in the special case where a first and second branches are decoded, and the second branch instruction is encountered by the decoder with no intervening instructions that change logical registers, it is possible to decode past that branch instruction also because the same DRAL contents is saved for both serializing instructions in the BRAL.

Figure 11:
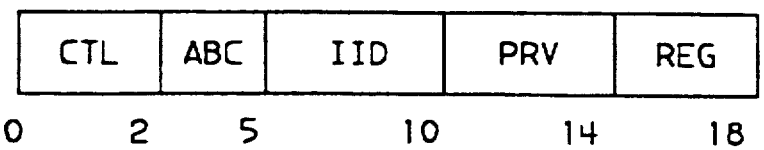
FIG. 11 shows the format of an entry in the ACL of FIG. 10.

An Array Control List (ACL) 110 is connected to receive status information and send control information from the physical registers and the rest of the computer system. Logic unit 101 controls the contents of ACL 110 and coordinates the operation of the ACL and the DRAL. For each of the physical registers which support the logical registers there is an ACL register which remembers status information related to that physical register. The ACL includes one entry for each physical register, each entry, in this embodiment, consisting of 14 bits divided into five fields as shown in FIG. 11: CTL, ABC, IID, PRV and REG. CTL is a control field which defines the overall status of the corresponding physical register. It may have the following values:

00: AVAILABLE - the physical register is not in use, and if needed it may be assigned. When CTL="00", the ABC, IID, PRV, and REG fields have no meaning.

01: ASSIGNED - the physical register is assigned to the logical register designated by the REG field. If an interruption were taken with the current instructions completed, this is the physical register which corresponds to that logical register. At any given moment there is one and only one physical register assigned to each logical register. When CTL="01", the ABC field is "000", and the IID and PRV fields have no meaning.

10: PENDING AND NOT YET LOADED - the physical register has been assigned to receive the result of an instruction which has not yet completed execution, and thus far the instruction has not loaded its result into this physical register. The IID field is the instruction identity number assigned to the instruction for which this physical register will receive a result. The ABC field is nonzero if this instruction has been issued conditionally and "000" otherwise. In most cases, the REG field is the number of the logical register for which this physical register is receiving a result, and the PRV field is the number of the physical register which holds the old value of that logical register. In the special case of compare instructions which do not change a logical register, a physical register is assigned anyway, the REG field is irrelevant, and the PRV field contains the number of this physical register.

11: PENDING AND LOADED - the physical register is assigned to receive the result of an instruction which has not yet completed execution, and it has received that result. The ABC, IID, PRV and REG fields have the same meaning as when CTL="10", except that the special case for compare instructions does not occur in this state.

The ABC field is used to identify the physical registers which are associated with instructions that are decoded beyond a conditional branch or serializing instruction. It is not necessary to implement such a field in order to make the invention work since this information could be determined by examining the IIDs. However, this field is implemented in this embodiment because it is more economical and faster to have a field devoted to remembering this one piece of information, than to determine it at periodic intervals by performing a test of the IIDs.

In the present case where three BRALs are provided so that up to three conditional paths may be created, the ABC field has three bits which are initially set to be "000". When a first conditional path causing instruction is decoded, the first BRAL is loaded with the DRAL contents and the ABC field is changed to "100" to indicate loading of the BRAL and the presence of an uncompleted serializing instruction. If a second conditional path causing instruction is encountered before the first conditional path causing instruction is completed, the second BRAL is loaded with the contents of the DRAL at that time and the ABC field is changed to "110". Finally, if a third conditional path causing instruction is decoded and the first two conditional path causing instructions are unresolved, the third BRAL receives the DRAL contents at that time and the ABC field becomes "111". Each bit in the ABC field is independently associated with a particular BRAL to show that the BRAL is active and storing particular DRAL contents for an unresolved branch or a serializing instruction. Logic unit 101 controls these functions.

If a serializing instruction is completed, without a line being removed from the I-Cache (or, in the case of a condition branch, the guessed branch direction is determined to be correct), the assigned BRAL contents will not be needed and the appropriate bit in the ABC field is set to 0. Referring to the previous example, conditional path causing instructions do not necessarily have to be resolved in the order of occurrence. If a first conditional path causing occurs (ABC="100") and then a second conditional path causing instruction occurs (ABC="110"), the second conditional path causing instruction may be completed first and the ABC field is simply reset to "100". If, as in the earlier example, three conditional path causing instructions occur in order (ABC="111") and the second conditional path causing instruction is resolved first, the second BRAL becomes available and the ABC field is set to "101". In addition, this means that a BRAL is available if another conditional path causing instruction is encountered. The bits in the ABC field can be set and reset in any order representing conditional path causing instruction occurrence and resolution in any order. Thus, if the ABC field is "101" a new conditional path causing instruction may be encountered and set the B bit so that the ABC field becomes "111" even though this does not represent the order of conditional path causing instruction occurrence.

Although above described recovery mechanism is used in the presently described embodiment, in a machine with a simpler structure, the present invention could operate in conjunction with a simpler conditional instruction mechanism such as existed on one of the earlier machines.

When a serializing instruction appears in the I-REG (33 in FIG. 2), the DECODING AND I-REG CONTROLS 34 signal the SERIALIZATION CONTROLS 56, and if a serialization operation is already in progress, then decoding of the instruction is delayed. When decoding does occur, both the SERIALIZATION CONTROLS 56 and the CONDITIONAL PATH CONTROLS 55 recognize that and start operations to control the instruction. The CONDITIONAL PATH CONTROLS 55 start up a conditional path for the following instructions so that if necessary they can be cancelled and control returned to the instruction which follows the serialization operation. The SERIALIZATION CONTROLS 56 monitor the SIIC-I bit 38 and look at whether it is ON for the instruction following the serializing instruction. If the SIIC-I bit is not ON, the controls 56 signal the DECODING AND I-REG CONTROLS 34 via one of their communication signals 59 to not decode the next instruction, and instead to signal the I-BUFFER CONTROLS to clear all of the prefetched instructions in the I-buffers 19,20,21 and the I-REG 33, and refetch them.

The CONDITIONAL PATH CONTROLS 55 receive signals (part of 61) from the EXECUTION LOGIC 54 which provide it with the necessary information to determine whether branch instructions have been guessed correctly or incorrectly. The CONDITIONAL PATH CONTROLS 55 also receive two signals from elsewhere in the CPU to enable them to determine when action needs to be taken for a serializing instruction. The first of these signals 40 comes from the instruction cache and indicates that a line has been removed from the instruction cache; this signal was described earlier. When this signal 40 comes on, the conditional path which is for the serializing instruction brings on a path wrong signal to the entire processor to cause all instructions along that path to be cancelled, and to cause decoding to return to the address of the instruction following the serialization operation. This is the same action as is taken for a wrongly guessed branch except that the conditional path remains active. The second of these signals 88 comes to the CONDITIONAL PATH CONTROLS 55 from the CROSS INTERROGATE CONTROLS (48 in FIG. 3) and indicates that the CPU has reached the time at which it is permitted to perform operations past the serializing point according to the architecture. Therefore, this signal 88 causes the conditional path for the serializing operation to signal that the path is correct, thereby removing the conditional status of the instructions along that path, and making the conditional path available for use by another branch or serializing operation. This is the same action as is taken for a correctly guessed branch. The SERIALIZATION CONTROLS 56 also watch this signal 88, and when it comes on they clear themselves to allow another serializing operation to take place.

FIG. 5 shows the DATA CACHE 73, and two mechanisms associated with it, the FETCH QUEUE 65 and the STORE QUEUE AND BUFFERS 64. The FETCH QUEUE 65 receives signals 68 from the EXECUTION LOGIC (54 in FIG. 4) which request that certain operations be performed by the DATA CACHE 73. It records these requests in the order in which they were received until the appropriate time to do them has been reached, and then performs them in the same order that they were received. Since it is possible for requests that were generated by conditional instructions to be sent to the FETCH QUEUE 65, it contains information 66 about conditional paths, receives signals 63 from the CONDITIONAL PATH CONTROLS (55 in FIG. 4), and has the ability to cancel those requests if operation has proceeded along a wrong conditional path. It should be understood that the STORE QUEUE 64 and EXECUTION LOGIC 54 also include similar mechanisms for canceling operations that were started as the result of proceeding along a wrong (subsequently cancelled) conditional path. The DATA CACHE 73 is structured similarly to the instruction cache described above, although a comparable degree of detail is not provided. It serves to remember lines of data which have recently been referenced as operands, either for fetching or storing. The DATA CACHE 73 receives fetch requests over the signals 75 from the FETCH QUEUE 65, and returns data over a bus 74 to the EXECUTION LOGIC [54 in FIG. 4].

The DATA CACHE 73 also receives store pretest requests from the FETCH QUEUE 65 over the same set of signals 75. A store pretest request occurs in anticipation of a store to an address, and is meant to determine whether the required line is in the cache with exclusive control, and whether there are any access exceptions associated with storing into the line. If the line is not in the cache, or is there but not with exclusive control, then the DATA CACHE 73 signals 9 the SYSTEM CONTROL ELEMENT [6 in FIG. 1]that it needs exclusive control of the line. This initiates the cross interrogate process described previously. When a store pretest is processed by the FETCH QUEUE 65, information related to it is also sent to the STORE QUEUE AND BUFFERS 64 over some signals 76.

The STORE QUEUE AND BUFFERS 64 serve to remember data that is to be stored, and information about that data such as the address at which it is stored in MAIN STORAGE (8 in FIG. 1), and the position in the DATA CACHE 73 at which the line is located. The STORE QUEUE AND BUFFERS 64 receive data from the EXECUTION LOGIC 54 over some signals 69, and addresses for storing the data from the FETCH QUEUE 65. The timing relationship in which this information is received, the structure of the information, and the manner in which it is handled by the STORE QUEUE AND BUFFERS 64 depend on details of how the CPU operates and are not germane to this disclosure. Since it is possible for data that is generated by conditional instructions to be sent to the STORE QUEUE AND BUFFERS 64, they contain information about conditional paths, receive signals 62 from the CONDITIONAL PATH CONTROLS (55 in FIG. 4), and have the ability to cancel those stores if operation has proceeded along a wrong conditional path. As is described in reference 1, a store is held in the STORE QUEUE AND BUFFERS 64 until the operation it is associated with reaches completion; that is, a point has been reached at which it is certain that that (and all prior) operations are to be performed. At that time, the store is released for storing into the DATA CACHE [73]using some signals 77, and for sending to the SYSTEM CONTROL ELEMENT (6 in FIG. 1) over the signals 9 which connect the CPU to it.

The foregoing descriptions of the FETCH QUEUE 65, the STORE QUEUE AND BUFFERS 64, and the DATA CACHE 73 are known in the prior art. What is new, and provided as part of the preferred embodiment of the present invention, is that the FETCH QUEUE 65 receives as part of its signals 68 from the EXECUTION LOGIC 54 an indication of where the serialization points are. For most serializing instructions, two points are identified, the first point being between the requests which precede those for the serializing instruction and the request which are for it, and a second point being between the requests which are for the serializing instruction and those which follow it. Some serializing instructions do not make any requests to the fetch queue, and therefore only have a single serializing point. When the FETCH QUEUE 65 reaches one of these serializing points it waits until the STORE QUEUE AND BUFFERS 64 signal (part of 76) that all stores have been stored into the DATA CACHE 73 and sent to the SYSTEM CONTROL ELEMENT (6 in FIG. 1), and then resumes processing subsequent requests.

When FETCH QUEUE 65 reaches the second (or only) serializing point associated with the serializing operation, it signals the STORE QUEUE AND BUFFERS 64 (part of 76). Then, when the STORE QUEUE AND BUFFERS 64 finish processing all stores, it generates a signal 87 which is sent to the CROSS INTERROGATE CONTROLS (48 in FIG. 3) to indicate that fact. As described above, the action of the CROSS INTERROGATE CONTROLS 48 is to wait until any pending cross interrogate operations have been processed, and then generate a signal 88 which is sent to the SERIALIZATION CONTROLS 56 and CONDITIONAL PATH CONTROLS 55 which informs them that the point has been reached when the CPU is allowed to proceed beyond the architected serialization point. This signal 88, its significance, and the actions taken as a result of it, have been described above.

Now that the invention has been described with reference to the preferred embodiments, various modifications and changes may be made by those skilled in the art without departing from the scope and spirit of the invention as defined by the claims.

Having thus described our invention, what we claim as new and desire to secure by Letters Patent is:

1. An apparatus for processing instructions beyond a serializing point, comprising:
a central processing unit;
a memory coupled to the central processing unit, the memory comprising a cache memory system;
fetching means, coupled to the memory, for fetching instructions, including serializing instructions, from the memory;
serializing instruction overlap means, coupled to said fetching means, for continuing to process instructions after a serialized instruction has been fetched from a data stream into an instruction cache of the cache memory system; said instruction overlap means also including:
monitoring means for monitoring data in the instruction cache for a change in the cache memory system;
decoding means, coupled to the fetching means, for decoding the instructions, the decoding means comprising detection means for detecting decoding of a serializing instruction; and,
conditional path means coupled to the monitoring means and the decoding means, for resetting the central processing unit to conditions existing just prior to decoding of an instruction immediately following a serializing instruction, when the monitoring means indicates that data in the instruction cache has been removed or changed during a time interval after a serializing instruction is present in a data flow up to the point when stores for that serializing instruction have been processed, so that the central processing unit will be reset and process instructions from the point when the serializing instruction has been fetched from the data stream.

2. The apparatus of claim 1, wherein said decoding further comprises: inhibit means for inhibiting decoding of further serializing instructions when the detection means detects decoding of a first serializing instruction.

3. The apparatus of claim 2, further comprising:
fetch queue means, coupled to said decoding means, for queuing data fetch requests to said memory;
sequencing means, coupled to the fetch queue means, for causing data fetch requests associated with instructions prior to the first serializing instruction to be performed prior to data fetch requests associated with the first serializing instruction, and for causing the data fetch requests associated with the first serializing instruction to be performed prior to data fetch requests associated with instructions subsequent to the serializing instruction.

4. The apparatus of claim 3 wherein the cache memory system includes an instruction cache, and wherein the monitoring means includes means for monitoring whether a line of data has been removed from the instruction cache.

5. The apparatus of claim 3, further comprising indicator means, coupled to the fetching means and the monitoring means, for storing an indicator bit indicative of whether at least a subset of the data in the cache memory system has been removed or changed.

6. The apparatus of claim 5, wherein the conditional path means comprises:
a first table for storing assignments of a subset of physical registers in the central processing unit to perform functions for a set of architected logical register,
a second table coupled to the first table,
first means, coupled to the decoding means, for copying the assignments from the first table to the second table responsive to decoding of the serializing instruction by the decoding means;
second means, coupled to the monitoring means, for copying the assignments from the second table back to the first table responsive to a determination by the monitoring means that the at least a subset of the data in the cache memory system has been removed or changed.

7. An apparatus for enabling a central processor to process instructions beyond a serializing point, comprising:

monitoring means for monitoring validity of data in a instruction cache of a cache memory coupled to the central processor;

conditional path means, coupled to the monitoring means, for restoring the central processor to conditions existing just after the serializing point, when the monitoring means indicates that at least a subset of the data in the cache memory has been removed or changed; and serializing means, coupled to the conditional path means, for enabling the conditional path means in response to decoding of a serializing instruction by the central processor when data in the instruction cache has been removed or changed during a time interval after as serializing instruction is present in processor data flow up to a point when stores for that serializing instruction have been processed.

8. The apparatus of claim 7, further comprising:

means for commencing execution of a stream of instructions following the serializing instruction.

9. A method for processing serializing instructions, comprising:

a monitoring step of continuously monitoring validity of data in a cache memory of a central processor;

a decoding step of decoding a serializing instruction;

a status storing step of storing data indicative of a state of the central processor, responsive to decoding of the serializing instruction;

a fetching step of fetching at least one instruction following the serializing instruction; and a status restoring step of, after the fetching step, restoring the central processor to conditions existing just after the decoding step, when the monitoring step indicates that at least a subset of the data in the cache memory has changed or has been removed during a time interval after a serializing instruction is present in processor data flow up to a point when stores for that serializing instruction have been processed.

10. The method of claim 9, further comprising the step of commencing execution of the at least one instruction following the serializing instruction.

11. The method of claim 10, wherein the monitoring step comprises a step of monitoring the cache memory system for removal of a line therefrom.

12. The method of claim 11, further comprising the step of setting a bit corresponding to the at least one instructions fetched by the fetching step.

13. The method of claim 12, wherein the decoding step further comprises the step of storing, in a first table, data indicative of assignment of physical registers in the central processor, to receive data for logical registers architected in the central processor; wherein the status storing step comprises the step of copy the first data from the first table to a second table; and, wherein the restoring step comprises the step of copying the assignment data back from the second table into the first table.

* * * * *